July 31, 1928.

L. H. DOHSE 1,678,937

AIR BRAKE PISTON CLAMP

Filed May 17, 1926

Inventor

Louis H. Dohse

By Philip A. H. Serell

Attorney

Patented July 31, 1928.

1,678,937

UNITED STATES PATENT OFFICE.

LOUIS H. DOHSE, OF TOLEDO, OHIO.

AIR-BRAKE-PISTON CLAMP.

Application filed May 17, 1926. Serial No. 109,809.

The invention relates to air brake piston clamps, and has for its object to provide a clamp which will positively hold the piston rod carried by a cylinder head of an air brake cylinder for preventing expansion of a spring interposed between the piston and inner side of the cylinder head. The positive holding overcomes danger of slipping which is one of the chief objections to devices now used for this purpose, and which often slip incident to engagement with lubricated parts.

A further object is to provide a U-shaped holding clamp, the opposite arms of which are provided with axially alined lugs which are receivable in diametrically disposed apertures in the hollow piston rod and the body cooperating with the cylinder head for preventing inward movement of the hollow piston rod.

A further object is to proportion the U-shaped body member whereby it will swing to opposite sides of the hollow piston according to working connections and at the same time will allow free access to the interior of the hollow piston for cleaning purposes.

A further object is to provide a threaded shaft threaded through one of the arms of the clamp, and which threaded shaft carries one of the lugs and to proportion the U-shaped member whereby different sizes of piston rods may be received therein if desired.

A further object is to dispose the lugs adjacent one of the sides of the arms of the clamp whereby the clamp may be easily moved pivotally to a position arching the end of the hollow rod thereby allowing the clamp to be used as a handle for carrying the cylinder head and piston to a shop for repair and cleaning purposes.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
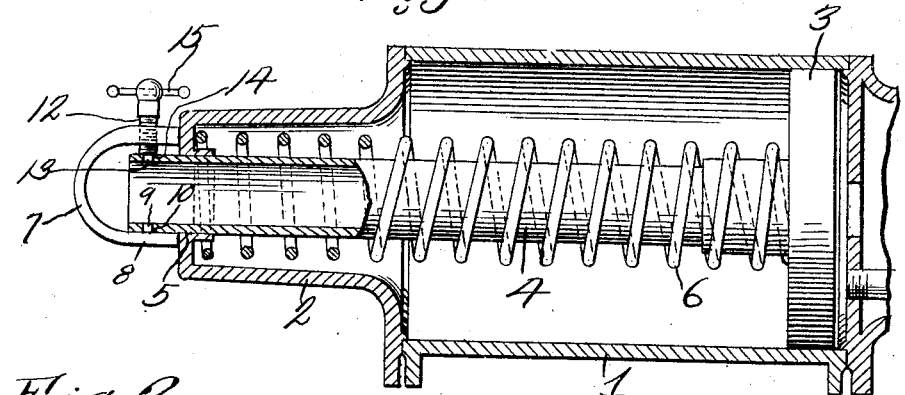
Figure 1 is a vertical longitudinal sectional view through a conventional form of air brake cylinder showing the clamp applied thereto.

Referring to the drawing, the numeral 1 designates a cylinder used in connection with a conventional form of air brake system and 2 a removable head carried thereby. Slidably mounted within the cylinder 1 is a piston 3, and which piston is provided with a hollow piston rod 4 which is slidably mounted in a bearing 5 of the head 2. Interposed between the inner side of the head 2 and the inner side of the piston 3 is an expansion spring 6, which normally forces the piston 3 inwardly, and which spring is under tension at all times. All of the above structure is a conventional structure in connection with air brake systems.

Figure 2:
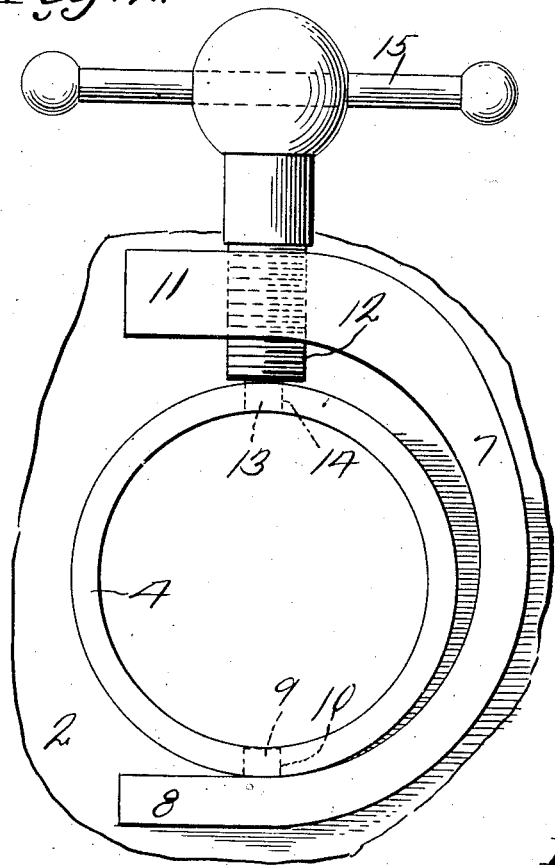
Figure 2 is an end view of the cylinder head showing the clamp applied thereto.
Figure 3:
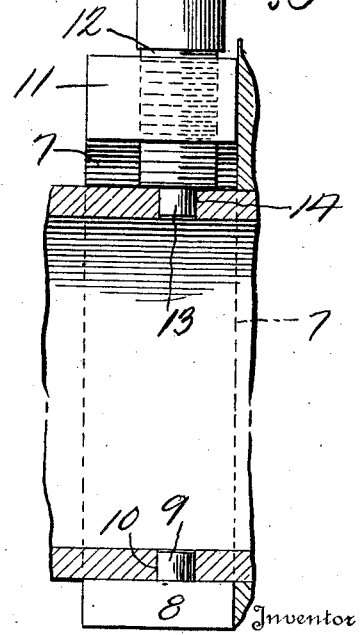
Figure 3 is a vertical longitudinal sectional view through a portion of the piston rod showing the clamp applied thereto and at a right angle thereto.

From time to time it is necessary to remove the cylinder head 2 and the piston 3 from the cylinder 1 for cleaning and repair purposes, and at which time these parts are usually carried to a shop where they can be properly overhauled and cleaned, however considerable difficulty is experienced in removing the head 2 on account of the expansive action of the spring 6, and a great many injuries to workmen are caused by this, while working on the device and any simple frictional means for holding the piston rod 4 is dangerous on account of slipping of parts, which often happens incident to lubrication on the parts. To obviate the above difficulties and positively hold the hollow piston rod 4, a U-shaped member 7 is provided. One of the arms 8 of the U-shaped member 7 is provided with a lug 9, which is received in an aperture 10 in one side of the outer end of the piston rod 4, and threaded through the arm 11 of the member 7 at a diametrical position and in axial alinement with the lug 9 is a threaded shaft 12, which threaded shaft is provided with a lug 13 which is received in an aperture 14 in the hollow piston rod 4. Aperture 14 is opposite the aperture 10 and it will be seen that the clamping device as a whole is held positively in a plane at a right angle to the plane of the hollow piston rod and in close engagement with the outer end of the cylinder head 2, thereby positively holding the hollow piston rod against inward movement in relation to the cylinder head 2 and preventing slipping of the parts in relation to each other under the influence of the coiled spring 6 at all times. It will be noted the U-shaped member 7 arches the side of the hollow piston rod 4, and may be placed on either side thereof as desired. It will also be noted when the device is placed in the position shown in Figures 2 and 3, it will not interfere with the insertion of any tool or cleaning implement into the hollow piston rod, which is one of the main difficulties with devices heretofore constructed for this purpose. It will also be seen by providing the U-shaped member 7, the device may be placed in the position shown in Figure 1 so it can be grasped by an operator during the removal of a cylinder head and the piston therewith, and the U-shaped member may be utilized as a handle for transporting the device from a car to a shop, and after which the U-shaped member can be pivotally moved to the positions shown in Figures 2 and 3 so that the hollow piston rod 4 may be easily cleaned. Lugs 9 and 13 are preferably positioned adjacent one side of the U-shaped member 7 so the device may be easily moved to a right angle position. The ends of the arms 8 and 11 are preferably flat so that when said ends are in engagement with the end of the cylinder 2 as shown in Figure 1, easy accidental pivotal movement of the U-shaped member is prevented. The distance between the arms 8 and 11 is preferably greater than the outer diameter of the hollow piston rod 4, which allows the same device to be used in connection with different sizes of piston rods, and at the same time allows sufficient play so that a pivotal action may take place over the end of the hollow piston rod 4.

From the above it will be seen that a clamping and holding device is provided for holding a hollow piston rod and cylinder head of the character set forth, which is simple in construction and will positively hold the hollow piston rod so that slipping thereof is absolutely prevented, and said device may be used as a handle member for moving the same from place to place. Threaded shaft 12 is preferably provided with a crossed handle 15 so that the same may be easily rotated.

The invention having been set forth what is claimed as new and useful is:—

1. An air brake piston clamp comprising a U-shaped body member adapted to arch the end of a piston rod with its arms on opposite sides of the rod, said arms at spaced points from the ends thereof having members extending towards each other and adapted to be received in recesses in a piston rod, whereby upon pivotal movement of the U-shaped member, the arms will engage a cylinder head and hold the piston rod against inward movement.

2. An air brake piston rod clamp comprising a U-shaped member adapted to arch the outer end of a piston rod and engage a cylinder head for holding the piston rod against inward movement, said clamp having its arms provided with inwardly extending members at points spaced from the outer ends of the arms and adapted to be received in recesses in the piston rod, said spacing of the inwardly extending members being adapted to allow the ends of the arms to force the piston rod outwardly upon pivotal movement of the U-shaped member from a right angle positon to the piston rod to a position arching the end of the piston rod in the plane of the piston rod.

3. An air brake piston clamp adapted to be secured to a piston rod outside of a cylinder head and to cooperate with said rod and cylinder head for holding the piston rod against inward movement, said clamp comprising a U-shaped member, inwardly extending members carried by the arms of the U-shaped member and adapted to be received in apertures in the piston rod, said U-shaped members being spaced from the outer ends of the arms and adapted upon movement of the U-shaped member from a transverse position to a position arching the end of the piston rod to cause the ends of the arms to move into engagement with the cylinder head and slightly move the piston rod outwardly.

In testimony whereof I hereunto affix my signature.

LOUIS H. DOHSE.